United States Patent [19]
Asao

[11] Patent Number: 5,675,238
[45] Date of Patent: Oct. 7, 1997

[54] POWER SUPPLY SYSTEM

[75] Inventor: Yoshihito Asao, Tokyo, Japan

[73] Assignee: Mitsubishi Denki Kabushiki Kaisha, Tokyo, Japan

[21] Appl. No.: 558,469

[22] Filed: Nov. 16, 1995

[30] Foreign Application Priority Data

Nov. 30, 1994 [JP] Japan .................... 6-297231

[51] Int. Cl.$^6$ .................... H02J 7/14
[52] U.S. Cl. .................... 322/28; 322/25
[58] Field of Search .................... 322/25, 26, 27, 322/28

[56] References Cited

U.S. PATENT DOCUMENTS

| | | | |
|---|---|---|---|
| 4,084,126 | 4/1978 | Clements | 322/8 |
| 4,896,637 | 1/1990 | Yamamoto | 123/179 B |
| 4,945,277 | 7/1990 | Iwatani et al. | 340/455 |
| 4,985,670 | 1/1991 | Kaneyuki et al. | 322/28 |
| 5,059,886 | 10/1991 | Nishimura et al. | 322/28 |
| 5,089,766 | 2/1992 | Iwatani | 322/25 |
| 5,453,904 | 9/1995 | Higashiyama et al. | 361/103 |

FOREIGN PATENT DOCUMENTS

| | | |
|---|---|---|
| 19925 | 1/1989 | Japan . |
| 43037 | 2/1989 | Japan . |

Primary Examiner—Steven L. Stephan
Assistant Examiner—Nicholas Ponomarenko
Attorney, Agent, or Firm—Sughrue,Mion,Zinn,Macpeak & Seas, PLLC

[57] ABSTRACT

A power supply system equipped with a power generating unit including an alternating-current generator and a rectifier for rectifying the generated output of the alternating-current generator. In addition, a switching relay is provided between a low-voltage load and a high-voltage load for selectively supplying the generated output from the power generating unit to one of the low-voltage load and high-voltage load. A field current control unit controls a field current flowing into a field winding of an AC generator and a high-voltage load control unit controls a switching operation of the switching relay and further controls the field current control unit in accordance with a state of the high-voltage load. The high-voltage load control unit operates the power generating unit through the field current control unit in switching between the low-voltage load and the high-voltage load so that the generated output is applied to the switching relay, thus removing oxide films on a surface of the switching relay to ensure the conductivity in the switching relay.

19 Claims, 4 Drawing Sheets

POWER SUPPLY SYSTEM

BACKGROUND OF THE INVENTION

1. Field of the Invention

The present invention relates to a power supply system, and more particularly to a power supply system for supplying a power to loads such as low-voltage loads and high-voltage loads in motor vehicles.

2. Description of the Prior Art

Referring to the circuit diagram of FIG. 4, a description will be made hereinbelow in terms of a conventional power supply system for use in motor vehicles or the like. In FIG. 4, a power generating unit 1, comprises an alternating-current (AC) generator 11 having a stator winding (armature winding) 11a and a field winding 11b and driven by an engine or the like, and a rectifier 12 connected with the stator winding 11a of the AC generator 11 so as to carry out full-wave rectification of the AC output of the AC generator 11. The rectifier 12 is composed of a positive output terminal 12a and a negative output terminal 12b, the negative output terminal 12b being grounded. In addition, the power generating unit 1 includes a terminal 13 connected to the positive output terminal 12a of the rectifier 12 and terminals 14, 15 coupled to both ends of the field winding 11b, respectively.

A field current control circuit 2 is for controlling the field current flowing through the field winding 11b and, although the a detailed circuit arrangement will not be described, It is equipped with at least a transistor 21, installed in a field current path, and a plurality of terminals 22 to 25. The terminal 22 is coupled to the positive side of a storage battery 3 being charged with the generated output (rectified output) the power generating unit 1 to serve as a detection terminal to detect the terminal voltage. The terminal 23 acts as an output terminal connected with a collector of the transistor 21 and further is coupled to the terminal 15 of the power generating unit 1 hereby making or breaking a field current path in response to the ON/OFF control of the transistor 21. Moreover, a lamp 4 is connected to between the terminal 24 and the positive polarity side of the storage battery 3 so as to light only when the field current flows therebetween. The terminal 25 functions as a control terminal connected to an output terminal 53 of a high-voltage load control unit 5 which will be described later. The field current control circuit 2 controls its own transistor 21 for high-voltage operations on the basis of a control signal from the high-voltage load control unit 5 through the terminal 25.

The high-voltage load control unit 5 is provided with terminals 51 to 56, the terminal 51 being connected through a key switch 6 to the positive side of the storage battery 3, while also being connected to a system voltage load 7 achive as a low-voltage load and additionally to a terminal 84 of a switching relay 8 serving as a switching means, and is further coupled directly to the terminal 14 of the power generating unit 1. The terminal 52 is connected with a terminal 83 of the switching relay 8, the terminal 53 is connected to the terminal 25 of the field current control circuit 2, the terminal 54 is a coupled with a high-voltage load 9, the terminal 55 is connected with a temperature sensor 10 which detects the temperature of the high-voltage load 9, and the terminal 56 is coupled to an engine control unit 20.

The high-voltage load 9 is cut off from the battery 3 for a short period of time (for example, approximately 5 minutes) so as to be driven by the output of the power generating unit 1. This high-voltage load 9 can be employed, for example, in a deicing system for rapid melting of ice on windshields and glass windows of a motor vehicle during winter in severely cold areas. In this case, the high-voltage load 9 functions as a heater.

The switching relay 8 performs the switching between the motor vehicle system voltage load containing normal storage battery 3 (low-voltage load) 7 side and the high-voltage load 9 side, and is composed of a relay coil 81, a relay movable contact (armature) 82, fixed contacts 82a and 82b, and terminals 83 to 86. One end of the relay coil 81 is connected with the terminal 83 and other end thereof is coupled to the terminal 84 and further to the fixed contact 82a of the switching relay 8. In addition, the movable contact 82 is coupled through the terminal 85 to the terminal 13 of the power generating unit 1, and the fixed contact 82b of the switching relay 8 is connected through the terminal 86 to the high-voltage load 9. In this switching relay 8, when the keyswitch 6 is in the OFF position the relay coil 81 is deenergized, one the relay normally couples with the fixed contact 82a side, i.e., the storage battery 3 and the system voltage load 7 side.

The operation of this system will be described below. First, a description will be made in terms of the high-voltage operating mode for supplying a power from the power generating unit 1 to the high-voltage load 9 when starting the motor vehicle. In response to the turning-on of the keyswitch 6, the relay coil 81 of the switching relay 8 is energized with the output from the terminal 52 of the high-voltage load control unit 5, with the result that the movable contact 82 of the switching relay 8 couples with the fixed contact 82b switching the switch 82 from the normal side,ie the low voltage storage battery 3 and system voltage load 7 side to the high voltage load 9.

When the switching relay 8 is switched from the system voltage load 7 side to the high-voltage load 9 side, the field current control circuit 2 cuts off the field current on the basis of the control signal from the terminal 53 of the high-voltage load control unit 5 so that the power generating unit 1 comes into the non-generating state. As a result, the power generating unit 1 stops generation for a time, before the relay coil 81 the switching relay 8 is energized in accordance with a signal from the terminal 52 of the high-voltage load control unit 5, with the result that the movable contact 82 is switched to the fixed contact 82b side, i.e., the high-voltage load 9 side. This switching operation is for the purpose of preventing damage to or breakdown of the switching relay 8 due to arcing or the like which can take place at the time of switching the output of the power generating unit 1.

Furthermore, in response to turning-on the keyswitch 6, a field current from the battery 3 passes through the keyswitch 6 and the terminal 14 of the power generating unit 1 and then flows into the field winding 11b of the AC generator 11 to thereby energize the field winding 11b. The transistor 21 of the field current control circuit 2, which is present in the path into which the field current flows, is intermittently (ON/OFF) controlled in accordance with the signal applied from the terminal 53 of the high-voltage load control unit 5 to the terminal 25 of the field current control circuit 2, with the result that a predetermined high voltage is obtained at the terminal 13 of the power generating unit 1 and this high-voltage is supplied to the high-voltage load 9.

During this high-voltage operating mode, the battery 3 supplies the field current to the AC generator 11 without itself being charged, and hence, comes into a discharged state. Accordingly, for prevention of the excessive discharge of the battery 3, the high-voltage operating mode is limited to the above-mentioned short period of time (about 5 minutes). In addition, if the terminal voltage of the battery 3, applied through the terminal 22 of the field current control circuit 2, becomes lower than a predetermined value, the field current control circuit 2 stops the high-voltage operating mode and returns to the normal operating mode to charge the battery 3.

Thereafter, when switched to the normal operating mode to apply power from the power generating unit 1 to the system voltage load 7 side, the field current control circuit 2 breaks the field current so that the power generating unit 1 gets into the non-generating state on the basis of the control signal from the terminal 53 of the high-voltage load control unit 5. As a result the generation from the power generating unit 1 stops for a time, before the coil 81 of the switching relay 8 is deenergized with the signal from the terminal 52 of the high-voltage load control unit 5 so that the relay movable contact 82 is switched to the fixed contact 82a, i.e., the system voltage load 7 side. The reason why the switching of the switching relay 8 is carried out after the generation of the power generating unit 1 stops for a time is the same as described above. Thus, the field current of the battery 3 flows into the field winding 11b of the AC generator 11 through the keyswitch 6 and the terminal 14 of the power generating unit 1, with the result that the AC generator 11 of the power generating unit 1 enters the generating state.

When the engine starts and the AC generator begins to generate power, the battery 3 is charged with the rectification output from the rectification output terminal 12a of the rectifier 12, that is, the generation output from the terminal 13 of the power generating unit 1, and at the same time a low voltage is applied to the system voltage load 7 side. At this time, the field current control circuit 2 detects the terminal voltage of the battery 3 at the terminal 22 by using, for example, a voltage-dividing resistor device, not shown. When the detected terminal voltage exceeds a predetermined value set by the voltage-dividing resistor device and others, the field current control circuit 2 turns the transistor 21 off. When, if the detected terminal voltage becomes lower than the foregoing predetermined value, the field current control circuit 2 turns the transistor 21 on. Thus, in accordance with such an ON/OFF operation, i.e., the intermittent operation, of the transistor 21, the field current flowing through the field winding 11b of the AC generator 11 is intermittently controllable so that the terminal voltage of the battery 3 is adjustable to become a given constant value.

There is a problem which arises with the above-described arrangement of the conventional power supply system, however, in that the relay movable contact 82 is usually in contact with the fixed contact 82a, and is therefore not in contact with the fixed contact 82b, i.e., not in the high-voltage operating mode, for a long time, so that the fixed contact 82b side is exposed to the surrounding environment and atmosphere. This is produces an oxide film thereon due to oxidation and contamination and, hence, conductive failure can take place between the contacts 82 and 82b.

SUMMARY OF THE INVENTION

It is therefore an object of this invention to provide a power supply system which is capable of preventing conductive failure between the contacts of the switch relay.

According to one aspect of the present invention, a power supply system comprises a power generating unit including an alternating-current generator for generating an alternating-current output and a rectifier connected with the alternating-current generator for rectifying the generated output of the alternating-current generator, switching means provided between a low-voltage load and a high-voltage load for selectively supplying the generated output from the power generating unit to one of the low-voltage load and the high-voltage load, first control means connected to a field winding of the alternating-current generator for controlling a field current flowing into the field winding, detection means for detecting a state of the high-voltage load, and second control means connected with the switching means, the first control means and the detection means for controlling a switching operation of the switching means and further for controlling the first control means when accordance with the state of the high-voltage load, the second control means operating the power generating unit through the first control means in switching between the low-voltage load and the high-voltage load so that the generated output is supplied to the switching means.

With this arrangement, an arc develops between the contacts of the switching means, which can easily destroy and remove the oxide film or the like attached to the surfaces of the switching means so as to prevent conductive failure in the switching means.

In one form of this invention, the second control means performs the switching operation of the switching means only when a voltage drop in the switching means exceeds a predetermined value. This permits the decision of the switching means on the switching operation to be made within the second control means, thus preventing unnecessary arc generation, thereby suppressing deterioration in the life of the contacts of switching means.

In another form of this invention, the second control means performs the switching operation of the switching means only when the connection time in which the switching means is connected to at least one of the low-voltage load and the high-voltage load is longer than a predetermined time period. This permits the decision of the switching means on the switching operation to be made within the second control means, thus preventing unnecessary arc generation thereby suppressing deterioration in the life of the contacts of the switching means. In addition, no external cables and the like are required, thereby improving workability and lowering manufacturing cost.

In a further form of this invention, the second control means performs the switching operation of the switching means only when the number of times of switching to at least one of the low-voltage load and the high-voltage load due to the switching means exceeds a predetermined value. Similarly, this allows the decision on on the switching operation to be made within the second control means, thus preventing unnecessary arc generation thereby suppressing deterioration in the life of the contacts of the switching means. In addition, no external cables and the like are required, thereby improving workability and lowering manufacturing cost.

In a still further form of the invention, the second control means performs the switching operation of the switching means by decreasing the field current flowing into the field winding of the alternating-current generator by a predetermined quantity. This makes the arc energy adjustable, thereby suppressing deterioration in the life of the contacts of the switching means.

BRIEF DESCRIPTION OF THE DRAWINGS

The object and features of the present invention will become more readily apparent from the following detailed descriptions of the preferred embodiments taken in conjunction with the accompanying drawings in which.

DESCRIPTION OF THE PREFERRED EMBODIMENT

First Embodiment

Figure 1:
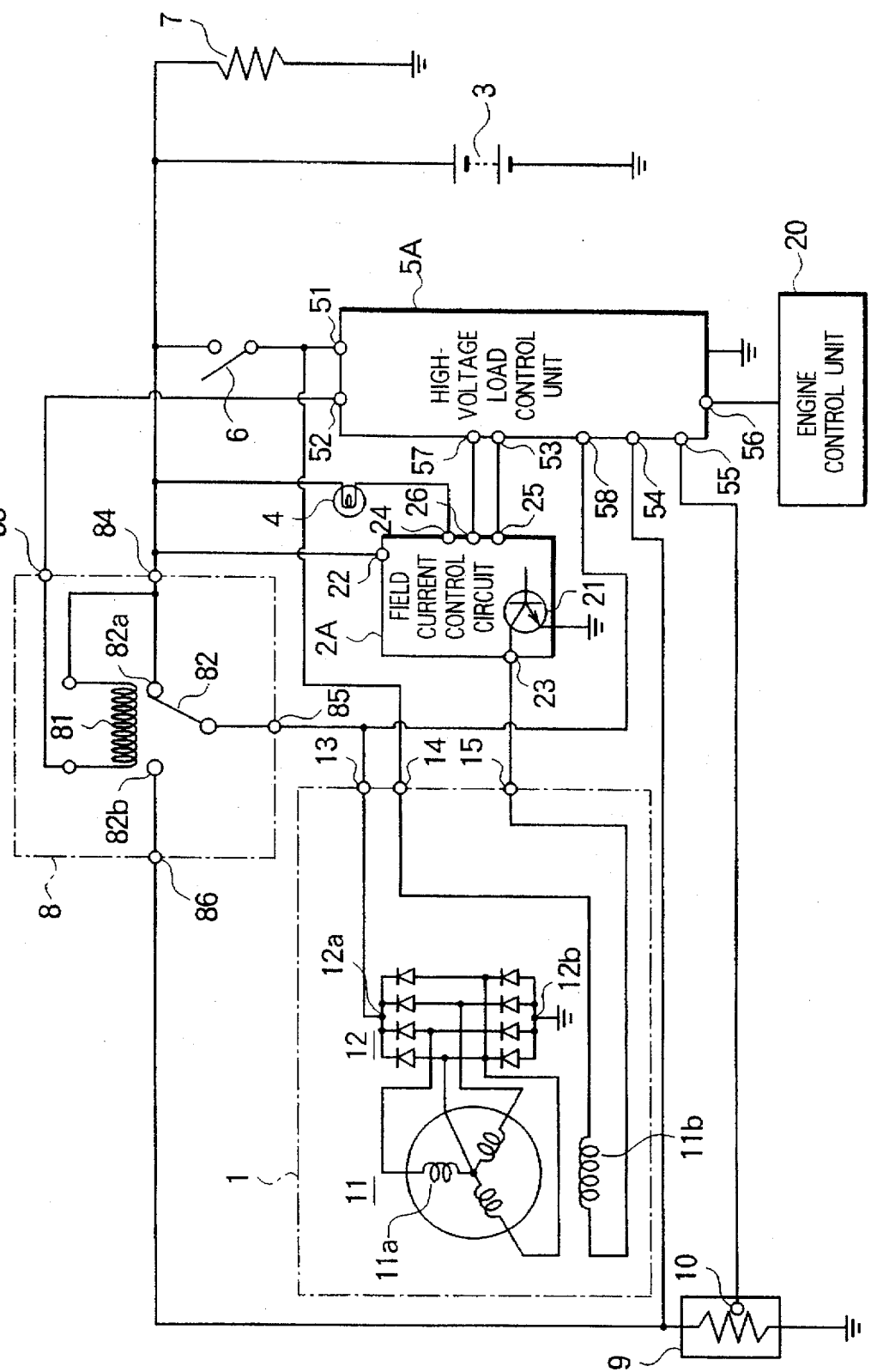
FIG. 1 is a circuit diagram showing an arrangement of a power supply system according to an embodiment of the present invention.
Figure 2:
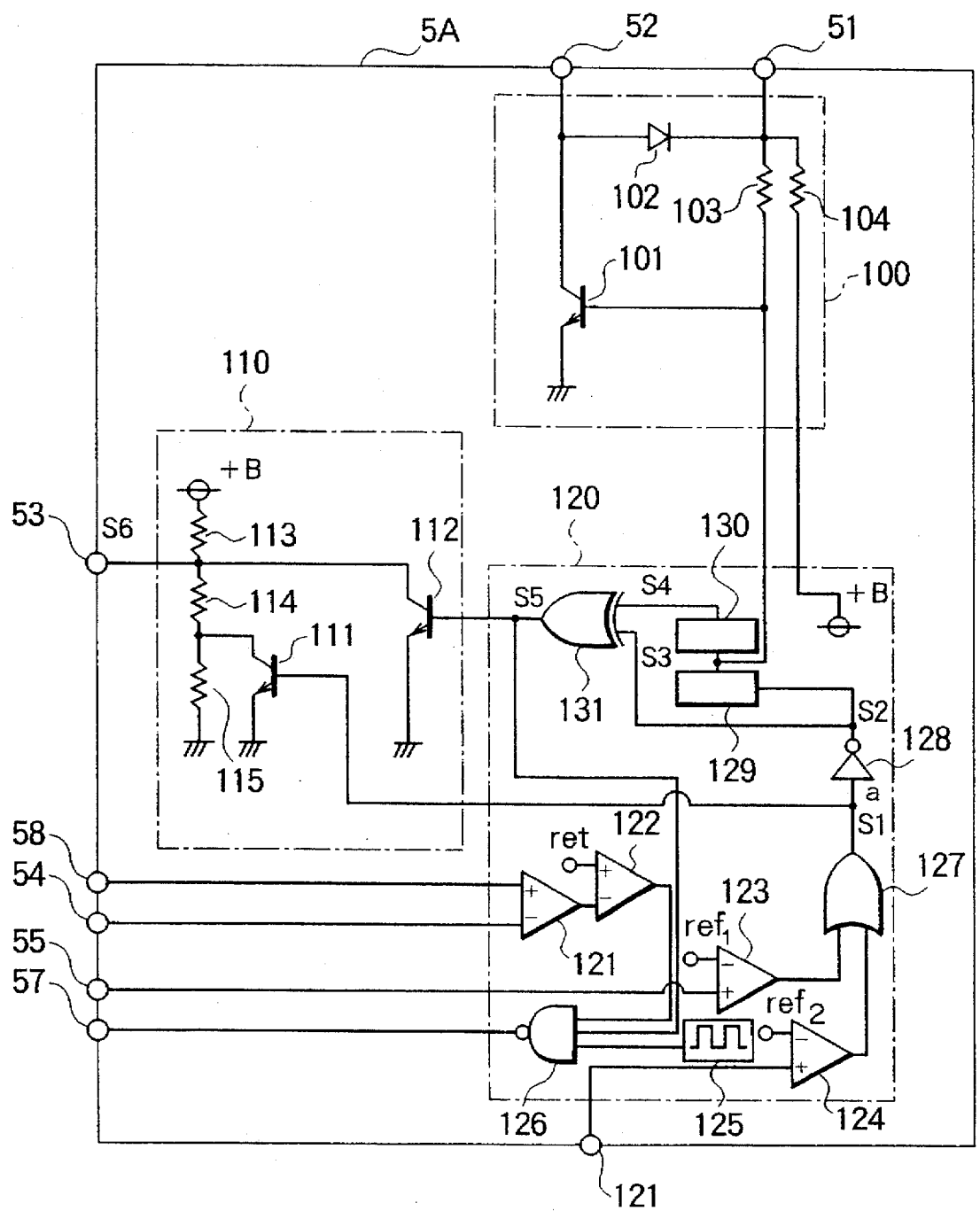
FIG. 2 is a circuit diagram showing the principal parts of the power supply system according to an embodiment of the present invention.

A description of an embodiment of the present invention will be given in conjunction with FIGS. 1 to 3. In FIGS. 1 and 2, elements or parts corresponding to those in FIG. 4 are designated with like numerals, thus detailed descriptions thereof will be omitted In FIG. 1, A field current control circuit 2A, serving as a first control means, is equipped with terminals 22 to 25 in the same manner as the foregoing conventional field current control circuit 2, and is additionally provided with a terminal 26. A high-voltage load control unit 5A, acting as a second control means, has terminals 51 to 56 like the aforesaid conventional high-voltage load control unit 5, and further has terminals 57 and 58 terminal 57 is connected to the terminal 26 of the field current control circuit 2A, while the terminal 58 is connected with a terminal 13 of a power generating unit 1 and a terminal 85 of a switching relay 8. With this arrangement, the high-voltage load control unit 5A monitors the potential difference between the terminals 58 and 54, that is, the potential difference (corresponding to the voltage drop) between a fixed contact 82b and a relay movable contact 82 serving as an opening and closing section of a switching means, thus allowing the voltage drop at the fixed contact 82b of the switching relay 8 to be detected.

The high-voltage load control unit 5A, as will be described later, performs a comparison between the detected voltage drop value and a predetermined reference value, and if the voltage drop value at the fixed contact 82b of the switching relay 8 exceeds the predetermined reference value, when the switching relay 8 is switched from the high-voltage operating mode to the normal-voltage operating mode a predetermined duty pulse signal, as a control signal is forcefully supplied through the terminal 57 to the terminal 26 of the field current control circuit 2A. Whereupon, the field current control circuit 2A operates such that a given field current of a storage battery 3 flows into a field winding 11b of an AC generator 11, with the result that the AC generator 11 temporarily generates power, and the generation current from the power generating unit 1 passes through the switching relay 8. Accordingly, at the moment when the movable contact 82 of the switching relay 8 is separated from the fixed contact 82b, an arc is generated therebetween, which can destroy the oxide film or the like on the surface of the fixed contact 82b.

FIG. 2 is a circuit diagram showing one example of a concrete circuit arrangement of the high-voltage load control unit 5A. In FIG. 2, the high-voltage load control unit 5A is composed of a drive circuit 100 for operating the switching relay 8, a drive circuit 110 for driving the field current control circuit 2A, and a control circuit 120 for controlling the drive circuits 100 and 110. The drive circuit 100 includes a transistor 101, a surge-absorbing diode 102, and resistors 103 and 104. The collector of the transistor 101 is coupled to the terminal 52 and further connected through the diode 102 to the terminal 51, while the emitter thereof is grounded, and the base thereof is connected through the resistor 103 to the terminal 51 and further connected with the output side of a delay circuit 129 of a control circuit 120 which will be described later. In addition, one end of the resistor 104 is in coupled with to the terminal 51, whereas the other end thereof is connected to the positive power terminal +B.

The drive circuit 110 is provided with transistors 111, 112, and resistors 113, 114, 115. The resistors 113, 114 and 115 are connected in series to each other and disposed between the positive power terminal +B and the ground. The node (junction) between the resistors 113 and 114 is connected to the terminal 53, while the node between the resistors 114 and 115 is connected with the collector of the transistor 111. In addition, the emitter of the transistor 111 is grounded, and the base thereof is connected with the output side of an OR circuit 127 of the control circuit 120 which will be described later. The collector of the transistor 112 is coupled to the node between the resistors 113 and 114, while the emitter thereof is grounded and the base thereof is connected to the output terminal of an exclusive OR circuit 131 of the control circuit 120.

The control circuit 120 has comparators 121 to 124, a pulse generator 125, a NAND circuit 126, an OR circuit 127, an inverter 128, delay circuits 129, 130, and an exclusive OR circuit 131. The inverting terminal of the comparator 121 is connected with the terminal 54, and the non-inverting terminal thereof is connected with the terminal 58. The non-inverting terminal of the comparator 122 is connected with the output side of the comparator 121, and the inverting terminal thereof is connected to a reference terminal ref to which a given reference voltage is applied which serves as a discrimination (reference) value of the arc generation. Further, the non-inverting terminal of the comparator 123 is connected with the terminal 55 and the inverting terminal thereof is connected with a reference terminal $ref_1$ to which a given reference voltage is supplied which is set in relation with the temperature of a high-voltage load 9. The non-inverting terminal of the comparator 124 is connected relation to the terminal 56, and the inverting terminal thereof is coupled relation to a reference terminal $ref_2$ to which a given reference voltage is applied which is determined, for example, in relation to the speed of the engine.

The given reference voltage being applied to the reference terminal $ref_1$ of the comparator 122 and serving as the discrimination value of the arc generation is set to, for a voltage value which is the result of the multiplication of the maximum generation current of the power generating unit 1 at the time of supply to the high-voltage load 9 by the contact resistance of the fixed contact 82b having an oxide film or the like thereon.

Furthermore, the first input terminal of the NAND circuit 126 is connected to the output side of the comparator 122, the second input terminal thereof is coupled to the output terminal of the exclusive OR circuit 131, and the third input terminal thereof is connected with the output side of the pulse generator 125 generating a pulse signal with a given duty ratio. One input terminal of the OR circuit 127 is in connection with the output side of the comparator 123, and the other input terminal thereof takes connection with the output side of the comparator 124, while the output terminal thereof is connected through the inverter 128 to the input side the delay circuit 129 and further to one input terminal of the exclusive OR circuit 131. The output side of the delay circuit 129 is connected with the input side of the delay circuit 130, the output side of the delay circuit 130 being connected with the other input terminal of the exclusive OR circuit 131.

Next, a description will be made in conjunction with the time chart of FIG. 3 in terms of the operation of the FIGS. 1 and 2 circuits. The operation in this embodiment is basically the same as the operation of the FIG. 4 conventional system except for the operation taken when the voltage drop at the fixed contact 82b of the switching relay 8 becomes excessive. Now, the operation immediately after the switching relay 8 is switched from the high-voltage operating mode side to the normal operating mode side, the detection output (voltage value) of the temperature sensor 10 to be applied to the terminal 55 exceeds the reference value of the comparator 123, or the engine rpm detection output (voltage value) from the engine control unit 20 to be applied to the terminal 56 becomes higher than the reference value of the comparator 124. Accordingly, a high-level (Hi) signal S1 as shown by (a) in FIG. 3 takes place at the output side of the OR circuit 127 responsive to the outputs of the comparators 123 and 124 will be considered. This signal S1 is delivered to the base of the transistor 111 and further to the inverter 128. A low-level (Lo) signal S2 as indicated by (b) of FIG. 3 appears at the output side of the inverter 128 inverting the signal S1. This signal S2 is directly supplied to one input terminal of the exclusive OR circuit 131 and further to the delay circuit 129 before being supplied as a low-level (Lo) signal S3 (see (c) FIG. 3) to the base of the transistor 101 and further led to the delay circuit 130 before being delivered as a low-level (Lo) signal S4 (see (d) of FIG. 3) to the other input terminal of the exclusive OR circuit 131. Whereupon, a low-level (Lo) signal S5 as indicated by (e) of FIG. 3 is sent from the output side of the exclusive OR circuit 131 to the base of the transistor 112.

Figure 3:
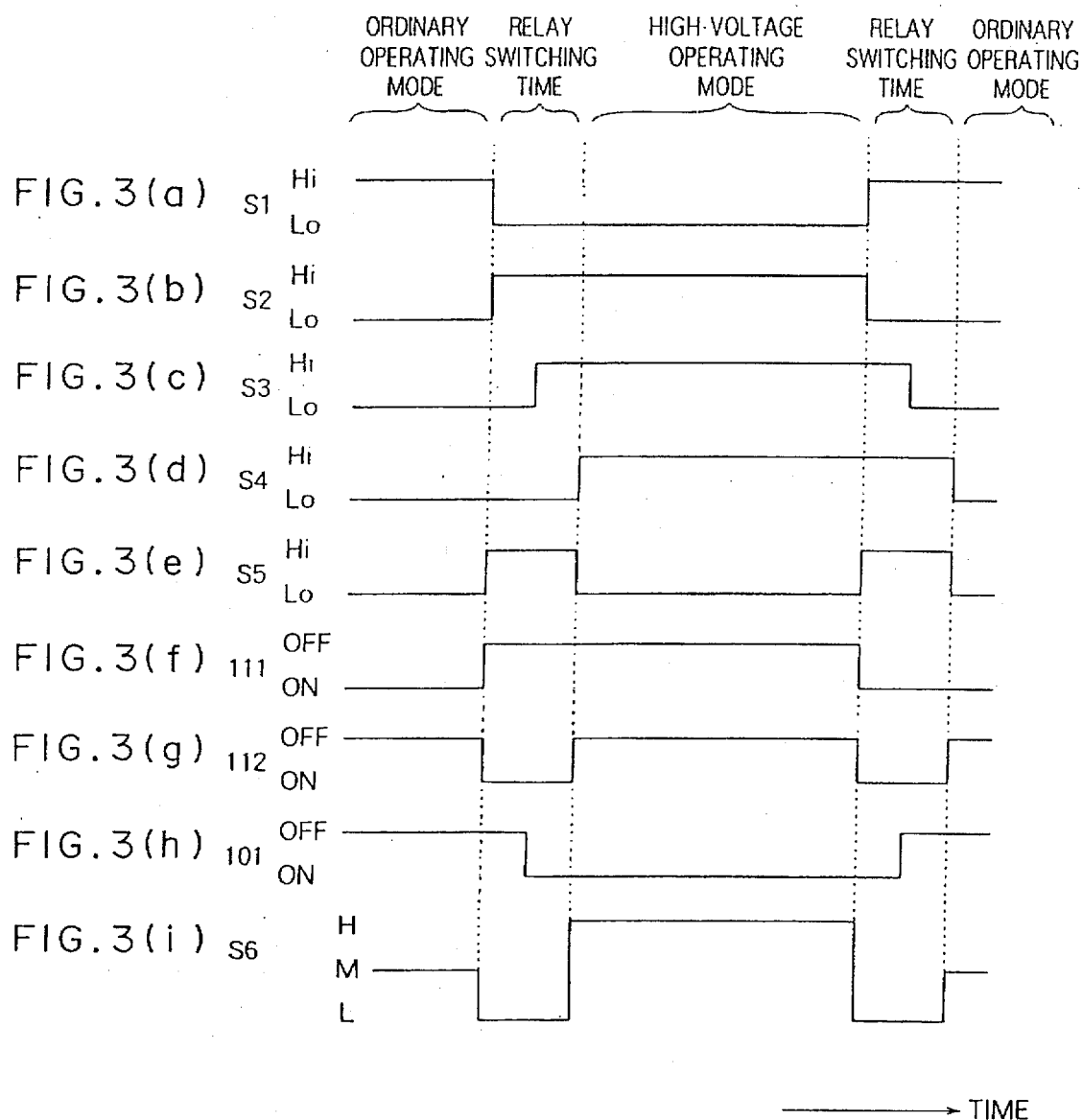
FIG. 3 is a time chart useful for describing an operation of the power supply system according to the embodiment of the present invention.
Figure 4:
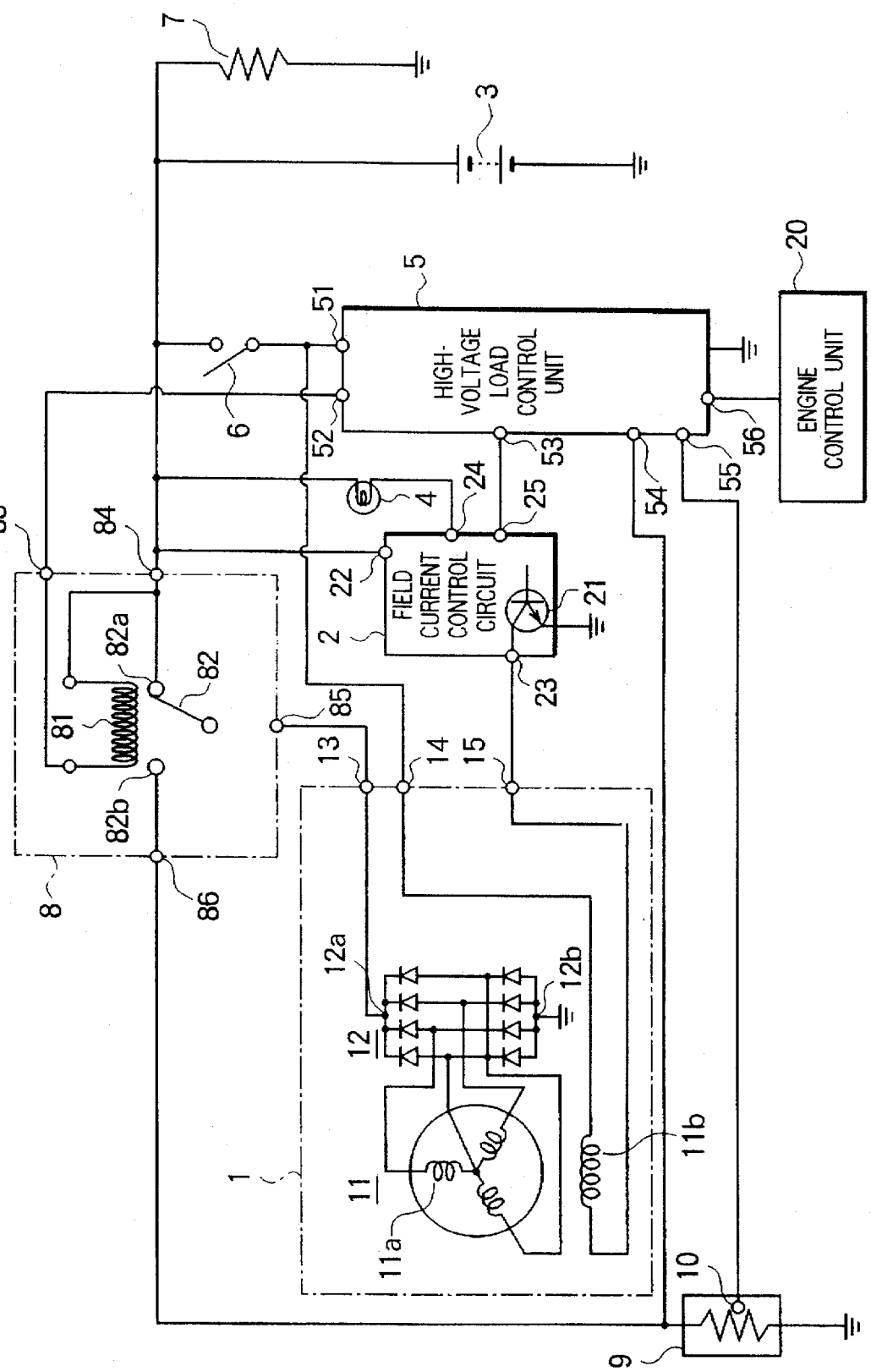
FIG. 4 is a circuit diagram showing an arrangement of a conventional power supply system.

At this time, as indicated by (f), (g) and (h) of FIG. 3 the transistors 111, 112 and 101 are in the ON, OFF and OFF states, respectively. Accordingly, a voltage (the voltage across the resistor 114) made by the division caused by the resistors 113 and 114 is obtainable as a middle-potential level (M) signal S6 as indicated by (i) of FIG. 3 at the terminal 53. This signal S6 is supplied, as the reference value for the control voltage of the power generating unit 1 at the time of the normal operating mode, to the terminal 25 of the field current control circuit 2A, by which supply the normal operating mode starts as described above.

Secondly, if in the normal operating mode the detection output (voltage value) of the temperature sensor 10 to be applied to the terminal 55 becomes lower than the reference value of the comparator 123 and the engine speed detection output (voltage value) of e engine control unit 20 to be applied to the terminal 56 also becomes lower than the reference value of the comparator 124, a low-level (Lo) signal S1 as indicated by (a) of FIG. 3 develops at the output side of the OR circuit 127 which receive signals from the comparators 123, 124. The signal S1 goes to the base of the transistor 111 and further to the inverter 128. As a result, a high-level (Hi) signal S2 as indicated by (b) of FIG. 3 is issued at the output side the inverter 128 inverting the signal S1. This signal S2 is directly input to one input terminal of the exclusive OR circuit 131. Thus, at this time, the transistor first turns OFF, then the transistor 112 turns ON, with the result that a signal S6 with the ground potential, i.e., a low-potential level (L) as indicated by (i) of FIG. 3, is obtainable at the terminal 53. This signal S6 is applied, as the control voltage reference value for the power generating unit 1 to be taken in switching from the normal operating mode to the high-voltage operating mode, to the terminal 25 of the field current control circuit 2A so that the power generating unit 1 comes into a non-generating state.

On the other hand, in a state in which the power generating unit 1 is in a non-generating state, the high-level (Hi) signal S2 developing at the output side of the inverter 128 is delayed by a given time period as indicated by (c) of FIG. 3 so as to be supplied to the base of the transistor 101 as the signal S3 which becomes a high level (Hi) when a given time period elapses after the signal S2 turns into the high level (Hi). Consequently, the transistor 101 comes into the ON state so that the relay coil 81 of the switching relay 8 is energized to cause the relay movable contact 82 to switch from the contact 82a side to the contact 82b side, i.e., switch from the system voltage load 7 side to the high-voltage load 9 side. At this time, the power generating unit 1 is still in the non-generating state, and hence no generation current flows into the switching relay 8, with the result let no arc generation takes place between the relay movable contact 82 and contact 82b of the switching relay 8.

Thereafter, the signal S3 is further delayed by a given time period in the delay circuit 130 so as to be supplied as a high-level (Hi) signal S4 as indicated by (d) of FIG. 3 to the other input terminal of the exclusive OR circuit 131, with the result that a signal S5 at the output side of the exclusive OR circuit 131 turns from the high level (Hi) state into the low level (lo) state as indicated by (e) of FIG. 3 so that the transistor 112 comes from the ON state into the OFF state. Accordingly, the voltage (the voltage across the resistors 114, 115), being divided with the resistors 113, 114 and 115, is obtainable at the terminal 53 as a high-potential level (H) signal S6 as shown by (i) of FIG. 3. This signal S6 is led, as the reference value for the control voltage of the power generating unit 1 in the high-voltage operating mode, to the terminal 25 of the field current control circuit 2A, thereby causing the operation to enter into the high-voltage operating mode as described above.

Moreover, when the detection output (voltage value) of the temperature sensor 10 to be applied to the terminal 55 becomes higher than the reference value of the comparator 123 or the engine speed detection output (voltage value) of the engine control unit 20 to be applied to the terminal 56 becomes higher than the reference value of the comparator 124, the operation is switched from the high-voltage operating mode to the normal operating mode. In this case, as well for that as described above, the switching relay 8 is switched after the power generating unit 1 comes into a non-generating state, and hence no arc is generated between the relay movable contact 82 and fixed contact 82b of the switching relay 8.

Next, a description will be made hereinbelow in terms of the operation taken when the voltage drop at the fixed contact 82b of the switching relay 8 becomes large, more specifically, the operation taken switching from the high-voltage operating mode to the normal operating mode. The high-voltage load control unit 5A monitors, using the comparator 127, the potential difference between the terminals 58 and 54, i.e., the potential difference (voltage drop) between the relay movable contact 82 and the fixed contact 82b, and supplies the comparison output to the next-stage comparator 122 as a value corresponding to the voltage drop so as to conduct the comparison with its reference value. If the voltage drop value exceeds the reference value $ref_1$, the comparator 122 issues a high-level signal to its own output side to output it to the NAND circuit 126. This NAND circuit 126 receives the high-level (Hi) signal S5 at the time of the switching of the operating mode even as seen from (e)

of FIG. 3. Therefore, when the high-level signal is delivered from the comparator 122 to the NAND circuit 126, the gate of the NAND circuit 126 essentially gets into the open state so as to allow a pulse signal with a given duty ratio from the pulse generator 125 to pass through the NAND circuit 126 as the control signal so as to be led through the terminal 57 to the terminal 26 of the field current control circuit 2A. As a result, the field current control circuit 2A intermittently ON/OFF-controls the transistor 21 on the basis of the control signal to the terminal 26, with the result that a given field current due to the battery 3 flows through the field winding 11b of the AC generator 11. Accordingly, the AC generator 11 temporarily carries out the generation so that the generation current flows from the power generating unit 1 into the switching relay 8 to cause an arc to develop between the movable contact 82 and fixed contact 82b of the switching relay 8 at the moment when the movable contact 82 is separated from the fixed contact 82b so as to destroy the oxide film or the like on the surface of the fixed contact 82b and other portions.

At this time, it is desirable that the field current to the field winding 11b of the AC generator 17 be set to a given value, for example, below ½ of that in the full-exciting state (the full-conductive state of the transistor 21), thus suppressing the generation current of the power generating unit 1 in order to prevent the contacts and others of the switching relay 8 from being damaged due to the large generation current. For this reason, the duty ratio of the pulse signal from the pulse generator 125 is set to half (50%) relative to the duty ratio (100%) in the full-exciting state so as to satisfy the foregoing conditions. That is, the switching operation of the switching relay 8 is made in a state in which the field current flowing into the field winding 11a of the alternating-current generator is decreased by a predetermined quantity.

As described above, according to this embodiment, when switching from the high-voltage operating mode for driving the high-voltage load to the normal operating mode for driving the system voltage load in addition to charging the battery, a given field current is compulsorily made to flow through the power generating unit 1 which in turn, temporarily carries out the generation so that the generation current causes arcing to take place between the relay movable contact 82 and fixed contact 82b of the switching relay 8. This can easily break and remove the oxide film and the like attached onto the surface of the fixed contact 82b and so on, thus preventing a conductive failure in the switching relay 8. In addition, with the field current at the time of the arc occurrence being substantially controlled with a duty ratio, the arc energy is adjustable to keep from shortening the life of the switching relay 8.

Other-Embodiments

A second embodiment of this invention will now be described below. Although in the foregoing embodiment the arc is designed to occur when the voltage at the fixed contact 82b of the switching relay 8 becomes large, it is also appropriate for the arc to be made to develop similarly when the voltage drop at the other fixed contact 82a of switching relay 8 exceeds a predetermined value. That is, the high-voltage load control unit 5A monitors, using the comparator 121, the potential difference between the terminals 51 and 54, i.e., the potential difference (voltage drop) between the relay movable contact 82 and fixed contact 82a, and compulsorily gives a given field current to the power generating unit 1 to permit the power generating unit 1 to temporarily generate a power as described before, by which generation current the arcing takes place between the movable contact 82 and fixed contact 82a of the switching relay 8. Thus, even in this case, as well as the aforementioned embodiment, it is possible to destroy and remove the oxide film and the like on the surface of the fixed contact 82 etc, thus preventing conductive failure in the switching relay 8.

Furthermore, although in the foregoing first and second embodiments the potential difference between the fixed contact and movable contact of the switching relay is detected to use it as the discrimination value for the occurrence of the arc, in a third embodiment of this invention, for example, the high-voltage load control unit 5A includes a timer (not shown) in place of the comparator 121 so as to measure the OFF time period of the transistor 112 to monitor the contact energization time, i.e., connection time of the movable contact 82 with the fixed contact 82b or 82a so that the arc occurs when the connection time becomes longer than a predetermined reference time preset in the comparator 122. Accordingly, just as in the first and second embodiments, the oxide film and the like on the contacts 82a, 82b are easily breakable and removable, which can prevent conductive failure in the switching relay 8. In addition, if the given reference time is appropriately set, unnecessary arc occurrence can be prevented to result in slower the deterioration of the switching relay 8. Moreover, in this case, cables and the like between the terminals 54, 86 and the terminals 58, 85 becomes unnecessary, thus improving the workability and lowering costs accordingly.

In a fourth embodiment, as well as in the foregoing third embodiment, the high-voltage load control unit 5A is equipped with a counter (not shown) in place of the comparator 121 so that the counter counts the number of times the transistor 101 is switched ON/OFF. When number of times of the switching operation exceeds a reference value preset in the comparator 22, the arc is designed to take place. This embodiment can have the same effects as the third embodiment.

It should be understood that the foregoing relates to only preferred embodiments of the invention, and that it is intended to cover all changes and modifications of the embodiments of the invention herein used for the purpose of the disclosure, which do not constitute departures from the spirit and scope of the invention. For example, although the description applies to motor vehicles, this invention is also applicable to other fields such as marine vessels and aircraft.

What is claimed is:

1. A power supply system comprising:
a power generating unit including an alternating-current generator for generating an alternating-current output, and a rectifier connected with said alternating-current generator for rectifying said generated output of said alternating-current generator;

switching means provided between a low-voltage load and a high-voltage load for selectively supplying said generated output from said power generating unit via a first terminal to one of said low-voltage load via a second terminal and said high-voltage load via a third terminal;

first control means connected to a field winding of said alternating-current generator for controlling a field current flowing into said field winding;

detection means for detecting a state of said high-voltage load; and second control means connected with said switching means, said first control means and said detection means for controlling a switching operation of said switching means and further for controlling said first control means in accordance with the state of said high-voltage load, said second control means operating said power generating unit through said first control means in switching between said low-voltage load and said high-voltage load so that the generated output is applied to said switching means, thereby generating an arc between said first terminal and one of said second and third terminals.

2. A power supply system as set forth in claim 1, wherein said second control means controls said switching means to operate when a voltage drop in said switching means exceeds a predetermined value.

3. A power supply system as set forth in claim 1, wherein said second control means performs the switching operation of said switching means when a time period said switching means is connected to at least one of said low-voltage load and said high-voltage load becomes longer than a predetermined time period.

4. A power supply system as set forth in claim 1, wherein said second control means performs the switching operation of said switching means when the number of times said switching means switches to at least one of said low-voltage load and said high-voltage load exceeds a predetermined value.

5. A power supply system as set forth in claim 1, wherein said second control means performs the switching operation of said switching means by decreasing the field current flowing into said field winding of said alternating-current generator by a predetermined quantity.

6. A power supply system as set forth in claim 1, wherein said second control means performs the switching operation of said switching means by decreasing the field current flowing into said field winding of said alternating-current generator by a predetermined quantity when a voltage drop in said switching means exceeds a predetermined value.

7. A power supply system as set forth in claim 1, wherein said second control means performs the switching operation of said switching means by decreasing the field current flowing into said field winding of said alternating-current generator by a predetermined quantity when a time period during which said switching means is connected to at least one of said low-voltage load and said high voltage load becomes longer than a predetermined time period.

8. A power supply system as set forth in claim 1, wherein said second control means performs the switching operation of said switching means by decreasing the field current flowing into said field winding of said alternating-current generator by a predetermined quantity when the number of times said switching means switches to at least one of said low-voltage load and said high-voltage load exceeds a predetermined value.

9. A power supply system as set forth in claim 1, wherein said first control means comprises a field current control circuit and said second control means comprises a high-voltage load control unit.

10. A power supply system as set forth in claim 1, wherein said arc destroys a nonconductive film on said one of said second and third terminals of said switching means.

11. A power supply system as set forth in claim 1, wherein said nonconductive film is an oxide film.

12. A power supply system as set forth in claim 1, wherein said second control means operates said power generating unit through said low-voltage load for a predetermined amount of time, thereby preventing damage to said one of said second and third terminals.

13. A power supply system as set forth in claim 2, wherein said voltage drop in said switching means is a voltage drop between said first terminal and one of said second and third terminals.

14. A power supply system comprising:

a power generating unit including an alternating-current generator for generating an alternating-current output, and a rectifier connected with said alternating-current generator for rectifying said generated output of said alternating-current generator, wherein said alternating-current generator includes a field winding;

a switching unit, provided between a low-voltage load and a high-voltage load and having first through third terminals, for selectively supplying said generated output from said power generating unit via the first terminal to one of said low-voltage load via the second terminal and said high-voltage load via the third terminal;

a first control unit connected to the field winding of said alternating-current generator for controlling a field current flowing into said field winding;

a detector for detecting a state of said high-voltage load and outputting a high-voltage load detection signal based on the detected state; and a second control unit connected to said switching unit, said first control unit and said detector, wherein in response to said high-voltage load detection signal said second control unit controls said first control unit to operate said power generating unit to generate a power output so that the generated power output is applied to said switching unit and controls a switching operation of said switching unit to switch the generated power output applied to said switching unit between said low-voltage load and said high-voltage load, thereby generating an arc between said first terminal and one of said second and third terminals.

15. A power supply system as set forth in claim 14, wherein said second control unit controls said switching unit to operate when a voltage drop in said switching unit exceeds a predetermined value.

16. A power supply system as set forth in claim 15, wherein said voltage drop in said switching unit is a voltage drop between said first terminal and one of said second and third terminals.

17. A power supply system as set forth in claim 14, wherein said second control unit performs the switching operation of said switching unit when a time period said switching unit is connected to at least one of said low-voltage load and said high-voltage load becomes longer than a predetermined time period.

18. A power supply system as set forth in claim 14, wherein said second control unit performs the switching operation of said switching unit when the number of times said switching unit switches to at least one of said low-voltage load and said high-voltage load exceeds a predetermined value.

19. A power supply system as set forth in claim 14, wherein said first control unit comprises a field current control circuit and said second control unit comprises a high-voltage load control unit.

* * * * *